April 20, 1937.  W. C. ROBINS  2,078,162
FISHHOOK
Filed Nov. 5, 1934
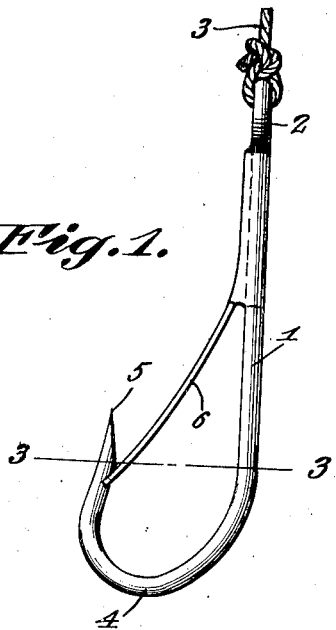
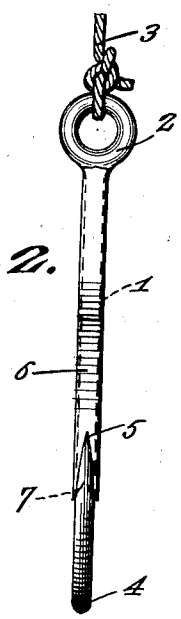
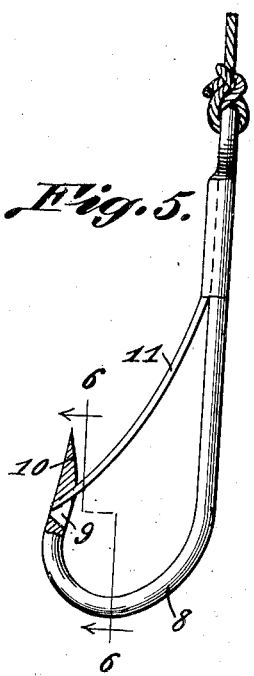
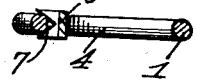
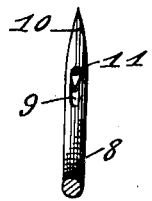
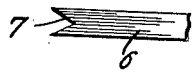
Walter C. Robins, INVENTOR
BY Victor J. Evans & Co.
ATTORNEY Patented Apr. 20, 1937

2,078,162

UNITED STATES PATENT OFFICE 2,078,162

FISHHOOK

Walter C. Robins, Carmel, Calif.

Application November 5, 1934, Serial No. 751,644

1 Claim. (Cl. 43—38)

This invention relates to fish hooks and the object is to provide a hook which will securely hold the fish after it is caught, and will prevent loss of the bait. Examples of fish hooks embodying the invention are shown in the accompanying drawing and will be hereinafter fully described, the novel features being particularly defined in the appended claim.

In the drawing:

Figure 1 is a side elevation of a fish hook embodying the invention.

Figure 2 is an edge elevation.

Figure 3 is a section on the line 3—3 of Figure 1.

Figure 4 is a detail plan view of the end of the locking spring shown in Figure 1.

Figure 5 is a side view, showing a modification.

Figure 6 is a section on the line 6—6 of Figure 5.

The hook comprises a shank 1 having an eye 2 at one end in which the line, indicated at 3, is secured. The opposite end of the shank is turned laterally and then back to converge slightly toward the shank and form the hook proper, 4, the end of the hook being tapered to a sharp point 5. Anchored upon the shank immediately adjacent the eye is one end of a spring 6 which may be flat or round and has its free end engaging the hook just below the point. The spring may be secured upon the shank in any preferred manner, as by brazing, and will be properly tempered to maintain its free end normally in firm engagement with the hook, and a notch 7 is formed in the end of the spring to span the hook, as shown in Figure 3, and thereby resist any tendency toward lateral displacement of the spring.

It will be pointed out that the spring is curved for its entire length in an arc the radius of curvature of which is struck from a center on the same side of the shank as the point of the hook. The purpose of this is to prevent accidental dislodgment of the spring from the point 5 of the hook. In well known constructions a barb is usually needed to prevent such dislodgment and by this invention the use of a barb is eliminated.

In the form shown in Figures 5 and 6, the hook 8 has an eye 9 at the base of its point 10 and the spring 11 has its free end formed into a point adapted to enter said eye 9, as shown.

When a fish bites, the spring will be pushed from the point of the hook and, after the point has penetrated the fish's mouth and emerged through the jaw or snout, the spring will return to normal position in engagement with the hook, thereby locking the fish on the hook. Pressure from the fisherman's fingers upon the spring will again disengage it from the hook to permit release of the fish. It is to be particularly noted that there is no barb on the hook to lacerate or mutilate the flesh of the fish when its withdrawal is attempted and, for the same reason, the possibility of injury to the hands of the fisherman is minimized. It is also to be noted that the end of the spring will hold the bait on the hook so that loss of the bait cannot occur.

Having described my invention, what I claim is:

A barbless fish hook comprising a shank being turned back upon itself to provide a hook portion, said hook portion having a sharp point and lying in the same vertical plane as the shank, and a spring having one end anchored to the shank and having its free end forked and straddling the hook just below the point, the path of travel of said spring being in the same vertical plane as the shank and hook, the pointed end portion of the hook converging towards the shank to lie in the path of travel of the free end of the spring and the spring being curved for its entire length in an arc the radius of curvature of which is struck from a center on the same side of the shank as the point of the hook for preventing accidental dislodgment of the spring beyond the point of the hook.

WALTER C. ROBINS.